(12) United States Patent
Mohanty et al.

(10) Patent No.: US 9,232,498 B2
(45) Date of Patent: Jan. 5, 2016

(54) TECHNIQUES FOR TRAFFIC DELIVERY TO A GROUP OF DEVICES

(75) Inventors: Shantidev Mohanty, Santa Clara, CA (US); Honggang Li, Shanghai (CN); Rui Huang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 184 days.

(21) Appl. No.: 13/976,986

(22) PCT Filed: Mar. 28, 2012

(86) PCT No.: PCT/US2012/031028
§ 371 (c)(1),
(2), (4) Date: Jun. 27, 2013

(87) PCT Pub. No.: WO2013/066384
PCT Pub. Date: May 10, 2013

(65) Prior Publication Data
US 2013/0272186 A1   Oct. 17, 2013

Related U.S. Application Data

(60) Provisional application No. 61/556,109, filed on Nov. 4, 2011.

(51) Int. Cl.
*H04W 4/06* (2009.01)
*H04W 68/02* (2009.01)
(Continued)

(52) U.S. Cl.
CPC .............. *H04W 68/02* (2013.01); *H04B 7/024* (2013.01); *H04B 7/0456* (2013.01); *H04J 3/12* (2013.01); *H04L 1/0026* (2013.01);
(Continued)

(58) Field of Classification Search
CPC ....... H04W 68/02; H04W 4/005; H04W 4/06; H04W 24/02; H04W 52/146; H04W 52/242; H04W 52/34; H04W 72/042; H04W 72/085; H04B 7/024; H04B 7/0456; H04B 7/0478; H04B 7/0486; H04B 7/0632; H04B 7/0639; H04J 3/12; H04L 1/1854; H04L 1/1861; H04L 5/0055; H04L 5/0078; H04L 5/14; H04L 25/0204; H04L 25/03898; Y02B 60/50
See application file for complete search history.

(56) References Cited

U.S. PATENT DOCUMENTS

2011/0201365 A1   8/2011 Segura
2012/0214520 A1*  8/2012 Bergqvist et al. ............. 455/458
(Continued)

OTHER PUBLICATIONS

Cha et al., "Multicast Operation for M2M Applications", May 6, 2011, IEEE 802.16 Broadband Wireless Access Working Group, IEEE C802.16p-11/0076r1, pp. 1-3.*
(Continued)

*Primary Examiner* — Paul H Masur
(74) *Attorney, Agent, or Firm* — Kacvinsky Daisak Bluni PLLC

(57) ABSTRACT

Techniques for managing traffic delivery to a group of devices are described. In some embodiments, a method for communicating in a wireless network may comprise receiving, at a base station, information intended for a group of devices identified by a device group identifier (DGID), mapping, at the base station, the DGID to a common identifier known by each device in the group of devices, and multicasting the information from the base station to the group of devices over one or more channels of the wireless network using the common identifier. Other embodiments are described and claimed.

22 Claims, 9 Drawing Sheets

(51) Int. Cl.
| | |
|---|---|
| *H04W 72/04* | (2009.01) |
| *H04B 7/02* | (2006.01) |
| *H04B 7/04* | (2006.01) |
| *H04W 24/02* | (2009.01) |
| *H04W 4/00* | (2009.01) |
| *H04W 72/08* | (2009.01) |
| *H04W 52/24* | (2009.01) |
| *H04J 3/12* | (2006.01) |
| *H04L 5/00* | (2006.01) |
| *H04L 5/14* | (2006.01) |
| *H04W 52/14* | (2009.01) |
| *H04L 1/00* | (2006.01) |
| *H04L 27/26* | (2006.01) |
| *H04W 52/34* | (2009.01) |

(52) U.S. Cl.
CPC ............ *H04L 1/0077* (2013.01); *H04L 5/0055* (2013.01); *H04L 5/0078* (2013.01); *H04L 5/14* (2013.01); *H04L 27/2662* (2013.01); *H04W 4/005* (2013.01); *H04W 4/06* (2013.01); *H04W 24/02* (2013.01); *H04W 52/146* (2013.01); *H04W 52/242* (2013.01); *H04W 72/042* (2013.01); *H04W 72/085* (2013.01); *H04W 52/244* (2013.01); *H04W 52/34* (2013.01); *Y02B 60/50* (2013.01)

(56) References Cited

U.S. PATENT DOCUMENTS

2013/0265932 A1* 10/2013 Huang et al. .................. 370/312
2013/0265984 A1* 10/2013 Li et al. .......................... 370/330

OTHER PUBLICATIONS

Kim et al., "Clean-up of M2M multicast service in IEEE P802.16 Rev3", Sep. 9, 2011, IEEE 802.16 Broadband Wireless Access Working Group, IEEE 802.16p-11/0220, pp. 1-4.*
Kim et al., "Multicast transmission in IEEE P802.16p", Nov. 6, 2011, IEEE 802.16 Broadband Wireless Access Working Group, IEEE 802.16p-11/0315, pp. 1-4.*
Kim et al., "Clarification of multicast operation of M2M devices in idle mode in 802.16e", Sep. 19, 2011, IEEE 802.16 Broadband Wireless Access Working Group, IEEE 802.16p-11/0218r2, pp. 1-4.*
Kim et al., "M2M Multicast Assignment in IEEE P802.16 Rev3", Sep. 9, 2011, IEEE 802.16 Broadband Wireless Access Working Group, IEEE 802.16p-11/0219, pp. 1-3.*
International Search Report and Written Opinion received for PCT Patent Application No. PCT/US2012/031028, mailed Mar. 28, 2012, 10 pages.
"WirelessMAN—Advanced Air Interface for Broadband Wireless Access Systems—Enhancements to Support Machine-to-Machine Applications", IEEE 802.16p-11/0033, Oct. 1, 2011, 63 pages, (Author unknown).
"M2M Group ID Assignment Scheme in IEEE802.16m System", Intel Corporation, IEEE C802.16p-11/0154r1, Jul. 8, 2011.

* cited by examiner

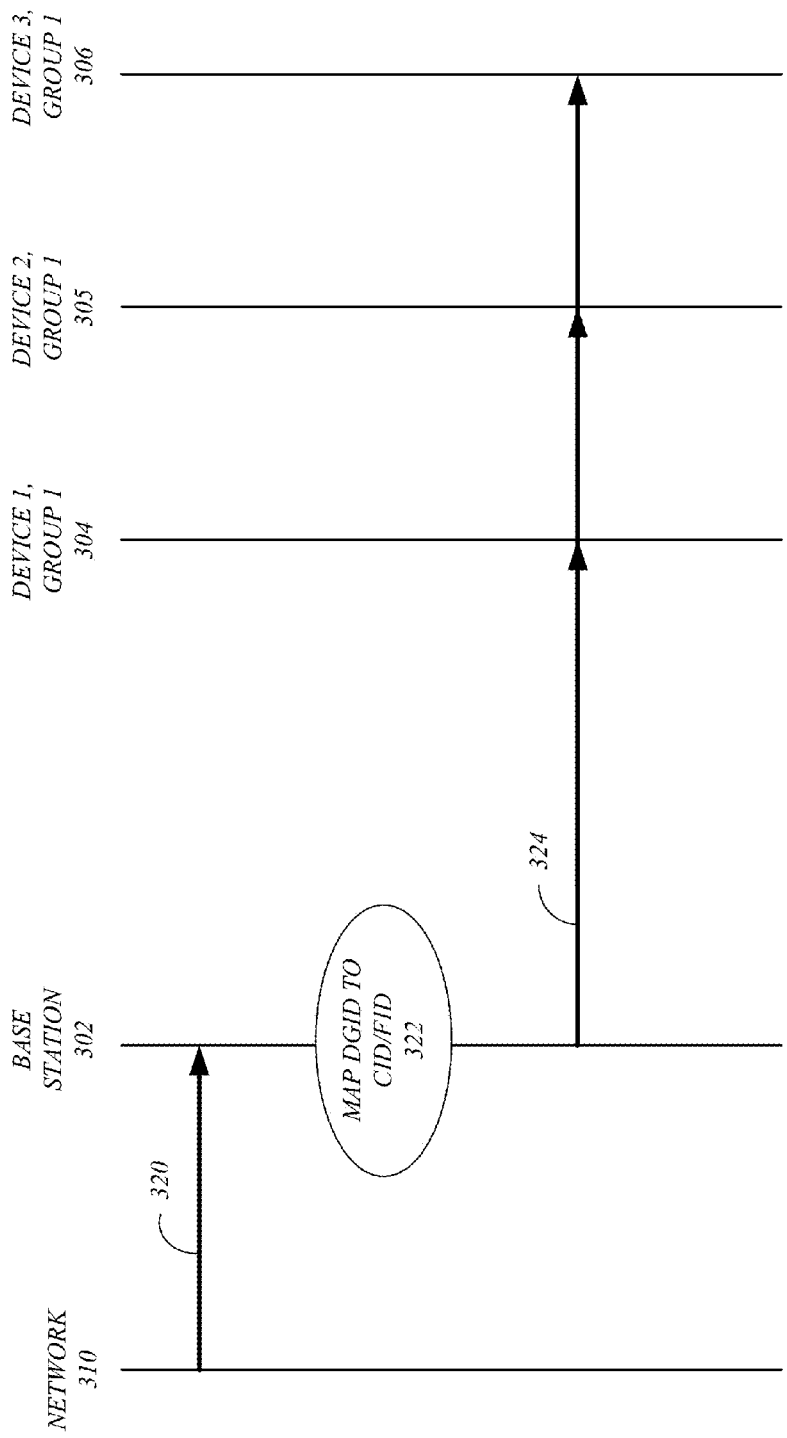

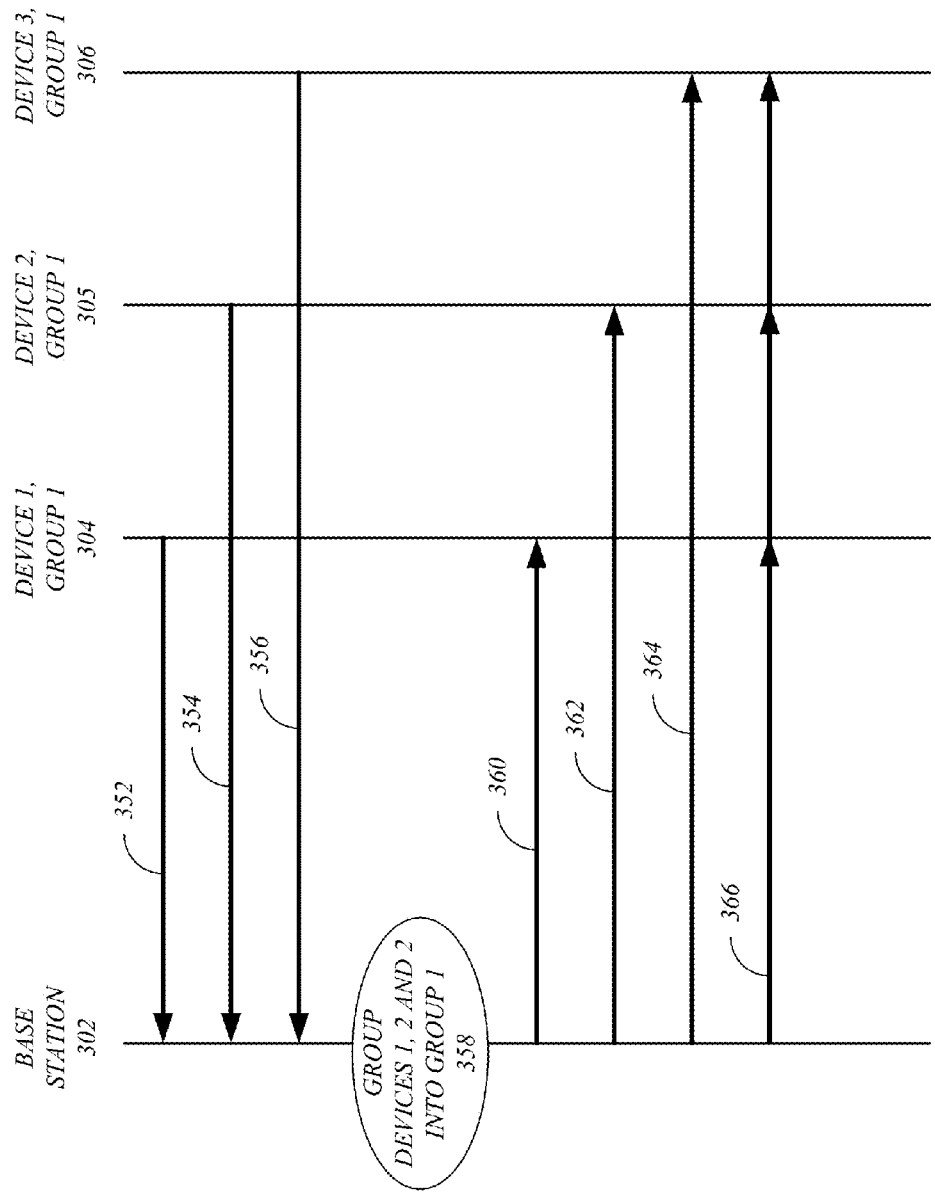

480

REQUESTING, BY A WIRELESS DEVICE, ACCESS TO A WIRELESS NETWORK
482

RECEIVING, FROM A BASE STATION, AN INDIVIDUAL CID/FID FOR INDIVIDUAL TRAFFIC AND A GROUP CID/FID FOR GROUP TRAFFIC
484

RECEIVING, FROM THE BASE STATION, MULTICAST INFORMATION INTENDED FOR THE WIRELESS DEVICE AND ONE OR MORE OTHER WIRELESS DEVICES ASSIGNED TO A COMMON GROUP IDENTIFIED BY THE GROUP CID/FID
486

RECEIVE, AT A BASE STATION, INFORMATION INTENDED FOR A GROUP OF DEVICES IDENTIFIED BY A DGID
462

MAP, AT THE BASE STATION, THE DGID TO A COMMON IDENTIFIER (GRUP CID/GROUP FID) KNOW BY EACH DEVICE IN THE GROUP OF DEVICES
464

MULTICAST THE INFORMATION FROM THE BASE STATION TO THE GROUP OF DEVICES OVER ONE OR MORE CHANNELS OF A WIRELESS NETWORK USING THE COMMON IDENTIFIER (GROUP CID/ GROUP FID)
466

*FIG. 4C*

TECHNIQUES FOR TRAFFIC DELIVERY TO A GROUP OF DEVICES

CROSS-REFERENCE TO RELATED APPLICATIONS

This application is a National Stage Entry of International Application No. PCT/US2012/031028, filed Mar. 28, 2012, which claims the benefit of U.S. Provisional Patent Application No. 61/556,109, filed Nov. 4, 2011, the entireties of both of which are hereby incorporated by reference.

BACKGROUND

Wireless communication systems communicate information over a shared wireless communication medium such as one or more portions of the radio-frequency (RF) spectrum. Recent innovations in mobile computing devices and the increased availability of advanced, interactive, multimedia and other data services have resulted in increased demands placed on wireless communications systems. Furthermore, the limited bandwidth of wireless communications systems and the cost of transmission of data, among other factors, are important considerations when implementing wireless communications systems. One particular area that results in increased demands on a wireless communications system is a large number of devices communicating in the system. In some instances, it may be advantageous to group a number of the devices communicating in the system into one or more groups to allow for group delivery of traffic common to each device in the group using multicast communications rather than individual communications to each device. As the number and type of devices continues to increase, the demands placed on wireless communications systems, such as increased overhead associated with each device, continue to increase. Consequently, techniques designed to manage traffic delivery for one or more groups of wireless devices in a wireless communications system are desirable.

BRIEF DESCRIPTION OF THE DRAWINGS

FIG. 3A illustrates one embodiment of a first transmission diagram.
FIG. 3B illustrates one embodiment of a second transmission diagram.
FIG. 4C illustrates one embodiments of a third logic flow.
FIG. 4D illustrates one embodiments of a fourth logic flow.

DETAILED DESCRIPTION

Figure 1:
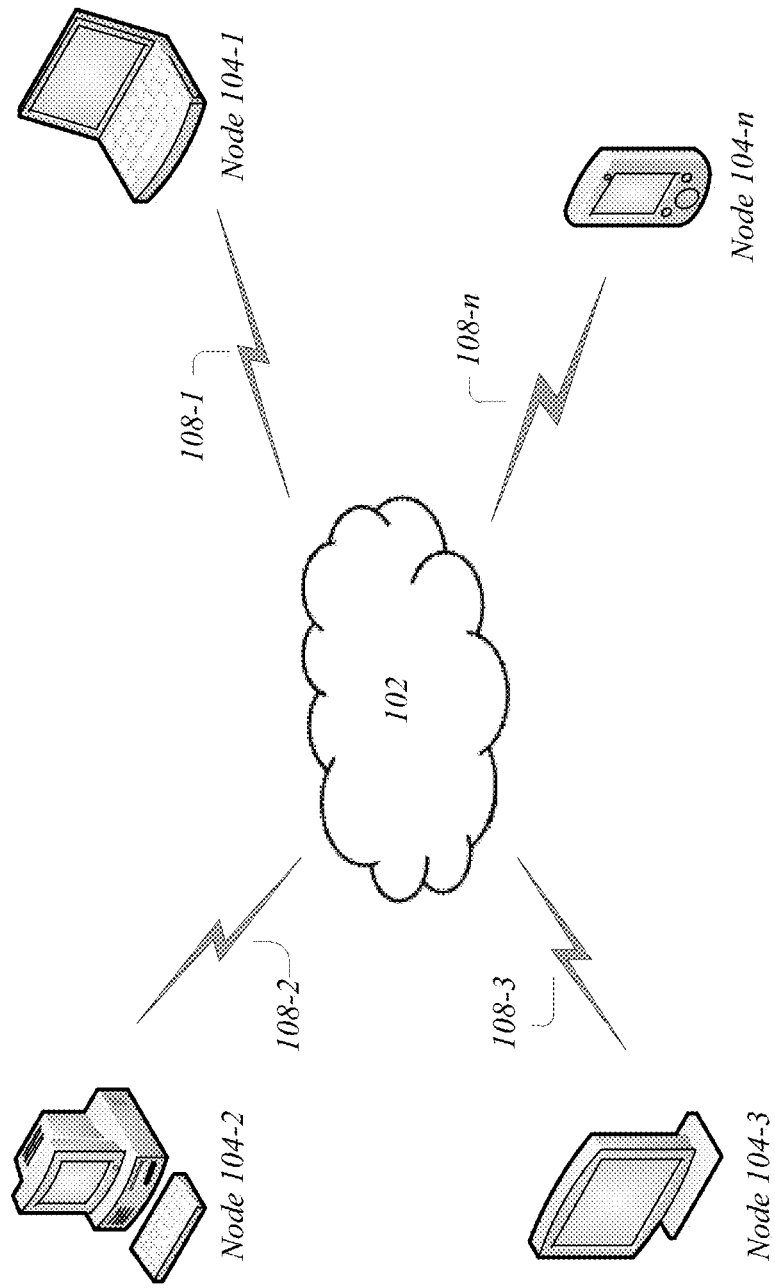
FIG. 1 illustrates one embodiment of a first communications system.

Various embodiments may be generally directed to techniques to manage traffic delivery to a group of devices in a wireless communications system. Some embodiments may be particularly directed to methods for grouping or aggregating devices and using known traffic identification techniques to identify group traffic to avoid the need to implement substantial changes to existing wireless communications systems and other infrastructure. In one embodiment, information intended for a group of devices identified by a device group identifier (DGID) may be received at a base station that forms part of the wireless communications system. At the base station, the DGID may be mapped to a common identifier known for each device in the group of devices, such a group connection identifier (CID) or group flow identifier (FID). In some embodiments, the information may be sent from the base station to the group of devices over one or more channels of a wired or wireless network using the common identifier. Other embodiments are described and claimed.

In wireless communications systems and networks, one or more subscriber stations (SSs) or other wireless devices receive traffic from a base station (BS) or other network entity in a downlink (DL) channel and transmit traffic to the BS in an uplink (UL) channel. The DL channel is a broadcast channel because transmissions by the BS can be received by all of the devices that are in a coverage region of the BS. However, different parts of the DL transmission may be destined for different devices. Therefore, the BS may inform the devices about their allocations in a DL frame before it transmits the traffic destined for specific devices in the DL channel. Therefore, different devices learn about the locations of their traffic, if any, using the allocation information in the DL frame and may process only the portions of the DL channel that contain their traffic.

The Institute of Electrical and Electronics Engineers (IEEE) standards, such as one or more of the 802.16 standards, specify different methodologies for a BS to inform the devices about the allocations in the DL frame, which are valid for both time division duplex (TDD) and frequency division duplex (FDD) systems and derivatives thereof, such as half-duplex FDD (HFDD) systems. The BS specifies the allocations in one or more information elements (IEs) of a downlink map (DL-MAP), which contain information about a particular portion of the DL channel, known as a DL burst. A device decodes the DL-MAP to learn about the DL bursts that contain, or may contain, its traffic. A DL burst that contains traffic for a device corresponds to the scenario in which the DL-MAP-IE contains an identification of connections for Media Access Control Protocol Data Units (MAC PDUs) that are present in a particular DL burst. In the 802.16p standards, for example, the identification of connections for Media Access Control Protocol Data Units (MAC PDUs) is specified by the CID field and in the 802.16m standards, for example, the identification of connections for Media Access Control Protocol Data Units (MAC PDUs) is specified by a Station Identifier (STID).

In the 802.16p standards, the connections are identified using Connection Identifiers (CIDs). In some embodiments, a device may have multiple CIDs for its different connections. Where the DL-MAP-IE does not contain the CIDs for the MAC PDUs present in DL burst, a device may choose to process that burst to search for its MAC PDUs. The device searches for its MAC PDUs using the header of the MAC PDUs that contain the information about the desired receiver(s) of the MAC PDUs. In the 802.16p standards, for example, the intended recipient of a MAC PDU is specified by the CID field of the MAC PDU header and in the 802.16m standards, for example, the intended recipient of a MAC PDU is specified by a flow identifier (FID) field of the MAC PDU header.

While not limited in this respect, some embodiments described herein may be operative in accordance with one or more of the IEEE 802.16p or 802.m standards and specifications. For example, one such specification (including progenies and variants) may be IEEE 802.16-2009, Air Interface for Fixed and Mobile Broadband Wireless Access System (hereinafter "IEEE 802.16") including the revision IEEE 802.16p/D3, Air Interface for Broadband Wireless Access Systems, Published in January 2012 (hereinafter "IEEE 802.16p") or IEEE 802.16m-2011, Advanced Air Interface with data rates of 100 Mbit/s mobile and 1 Gbit/s fixed (hereinafter "IEEE 802.16m"). Other embodiments are described and claimed.

In various embodiments, the CID or FID field may identify an intended receiver for unicast connections. However, as the number of devices in a wireless communications system continues to increase, the need for group or multicast communications becomes an increasing important design consideration to conserve bandwidth for the system. For example, a CID may be encoded with a fixed length of 16 bits. When the same information is sent to a large number or group of users, repetition of this 16 bit CID for each individual message to each intended user may unnecessarily consume bandwidth. Additionally, if the same information needs to be sent to all the devices, then instead of sending multiple copies of the message to different users, a single copy can be sent and all the users can receive this single message. Therefore, in some embodiments, it may be advantageous to group one or more devices together and to multicast information to the group using a group CID to reduce overhead in a wireless communications system.

While not limited in this respect, one particular device or network that may be particularly suited to the enhanced grouping and messaging described herein may be machine-to-machine (M2M) devices and networks. M2M communications refer, in some embodiments, to technologies that allow both wireless and wired systems to communicate with other devices having the same or similar abilities. In some M2M systems, a device such as a sensor or meter may be arranged to capture an event such as a temperature, inventory level, or other suitable parameter that is relayed through a network to an application that is operative to translate the captured event into meaningful information. M2M networks may allow for any number of implementations, business opportunities and connections.

M2M communications is a capability that enables the implementation of an "Internet of things." In some embodiments, M2M communications may be defined by an information exchange between a subscriber station and a server in a core network through a base station or a connection between subscriber stations. In various embodiments, the communications in an M2M system may occur without human interaction.

The expansion of wireless networks across the world has made it far easier for M2M communication to take place and has lessened the amount of power and time necessary for information to be communicated between machines and devices. As a result, M2M systems are being deployed in wireless networks such as one or more networks arranged to operate in accordance with one or more of the IEEE 802.11 or 802.16 standards or 3G or LTE or LTE-Advanced standards.

M2M systems deployed in a wireless network are designed to support a large number of M2M devices and mechanisms for low power consumption. As a result, theses systems often include a large number of M2M devices in the domain of an M2M base station. This large number of M2M devices leads to a large amount of interactions between the M2M devices and the M2M base station, resulting in a large amount of overhead for the wireless communication system. In various embodiments, this may result in increased network usage and congestion. It may be advantageous, therefore, to avoid communicating with each of the plurality of M2M devices individually when possible. Consequently, techniques for managing group traffic for M2M devices in a M2M wireless communication system are described. The embodiments are not limited in this respect.

FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The communications system 100 may communicate information in accordance with one or more standards as promulgated by a standards organization. In one embodiment, for example, various devices comprising part of the communications system 100 may be arranged to operate in accordance with one or more of the IEEE 802.16 standards for WMAN including standards such as 802.16-2004, 802.16.2-2004, 802.16e-2005, 802.16f, 802.16m, 802.16p, 802.16.1b progeny and variants; WGA (WiGig) progeny and variants or a 3GPP Long-Term Evolution (LTE) standard. In some embodiments, the communications system 100 may be arranged to communicate in accordance with any fourth generation (4G) network or radio technology progeny and variants.

In various embodiments, the communications system 100 may be arranged to operate in accordance with one or more of the IEEE 802.11 standard, the WiGig Alliance™ specifications, WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the communications system 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; European Computer Manufacturers Association (ECMA) TG20 progeny and variants; and other wireless networking standards. The embodiments are not limited in this context.

The communications system 100 may communicate, manage, or process information in accordance with one or more protocols. A protocol may comprise a set of predefined rules or instructions for managing communication among nodes. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

It is worthy to note that "a" and "b" and "c" and similar designators as used herein are intended to be variables representing any positive integer. Thus, for example, if an implementation sets a value for a=5, then a complete set of software components 122-a may include components 122-1, 122-2, 122-3, 122-4 and 122-5. The embodiments are not limited in this context.

As shown in FIG. 1, the communications system 100 may comprise a network 102 and a plurality of nodes 104-n, where n may represent any positive integer value. In various embodiments, the nodes 104-n may be implemented as various types of wireless devices. Examples of wireless devices may include, without limitation, a station, a subscriber station, a base station, a wireless access point (AP), a wireless client device, a wireless station (STA), a laptop computer, an ultrabook computer, ultra-laptop computer, portable computer, personal computer (PC), notebook PC, handheld computer, M2M device, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, sensor, meter and so forth.

In some embodiments, the nodes 104-n may comprise one more wireless interfaces and/or components for wireless communication such as one or more transmitters, receivers, transceivers, radios, chipsets, amplifiers, filters, control logic, network interface cards (NICs), antennas, antenna arrays, modules and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the nodes 104-n may comprise or form part of a wireless network 102. In one embodiment, for example, the wireless network 102 may comprise a Worldwide Interoperability for Microwave Access (WiMAX) network. Although some embodiments may be described with the wireless network 102 implemented as a WiMAX wireless network for purposes of illustration, and not limitation, it can be appreciated that the embodiments are not limited in this context. For example, the wireless network 102 may comprise or be implemented as various types of wireless networks and associated protocols suitable for a Wireless Personal Area Network (WPAN), a Wireless Local Area Network (WLAN), a Wireless Metropolitan Area Network, a Wireless Wide Area Network (WWAN), a Broadband Wireless Access (BWA) network, 3GPP network, LTE network, LTE-Advanced network, a radio network, a cellular network, a television network, a satellite network such as a direct broadcast satellite (DBS) network, and/or any other wireless communications network configured to operate in accordance with the described embodiments. Other embodiments are described and claimed.

Figure 2:
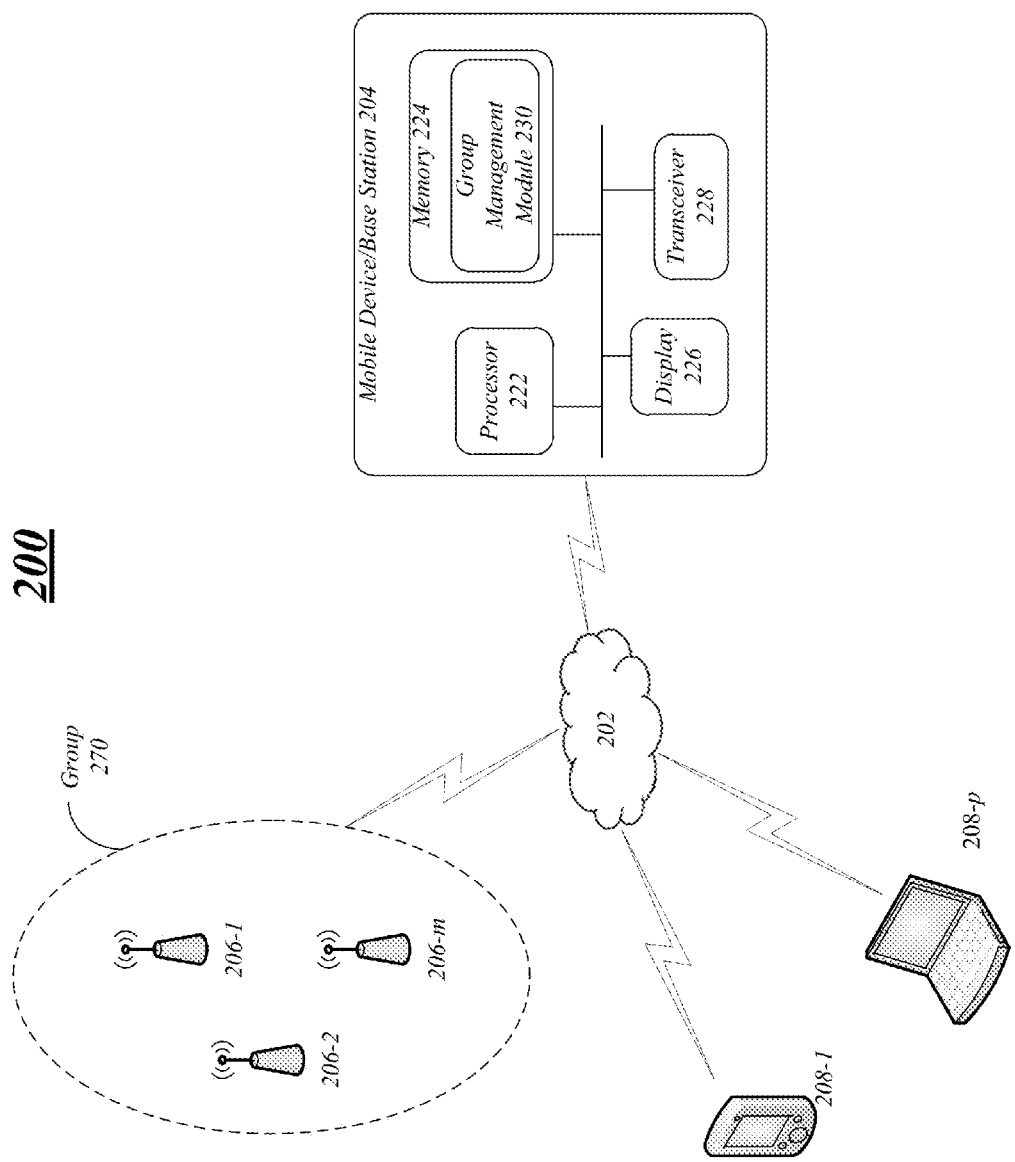
FIG. 2 illustrates one embodiment of a first apparatus and a second communications system.

FIG. 2 illustrates a first apparatus 204 and a second system 200. As shown in FIG. 2, the second system 200, which may comprise a wireless communications system similar to that described with reference to FIG. 1, may include nodes 206-m, 208-p, 204, 266 and 268 and wireless network 202. Wireless network 202 may comprise the same or a similar network to wireless network 102 described in FIG. 1. Nodes 206-m, 208-p, 204, 266 and 268 may comprise mobile computing device similar to nodes 104-n described in FIG. 1. As shown in FIG. 2, a first apparatus comprising mobile computing device 204 has been expanded to show additional details. It should be understood that any suitable device or network may contain the same or similar functionality and still fall within the described embodiments. Furthermore, while a limited number of mobile computing devices, nodes, wireless networks and modules are shown in FIG. 2 for purpose of illustration, it should be understood that the embodiments are not limited to the number or type of elements or modules shown in FIG. 2. Other embodiments are described and claimed.

In various embodiments, mobile computing device 204 may include a processor 222, a memory 224, a display 226, and one or more radios or transceivers 228. Mobile computing device 204 may also include a group management module 230 in some embodiments. While shown as contained or stored within memory 224 in FIG. 2, it should be understood that group management module 230 may contained, stored or implemented elsewhere and still fall within the described embodiments. While not shown, mobile device 204 may also include an antenna array communicatively coupled to transceivers 228 in some embodiments. Mobile computing device 204 may be in wireless communication with one or more of mobile computing devices 206-m, 208-p, 204, 266 and 268 using wireless network 202. For purposes of illustration, system 200 will be described hereinafter as a WiMAX system where mobile computing device 204 comprises a base station, computing devices 208-p comprise non-grouped or individual devices, and computing devices 206-m comprise grouped devices. Some embodiments described herein refer to the grouped devices 206-m as M2M devices 206-m. The embodiments are not limited in this context.

As shown, mobile computing device 204 may comprise a processor circuit or processor 222. The processor 222 may be implemented as any processor or processor circuit, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 222 may be implemented as a general purpose processor, such as a processor made by Intel® Corporation, Santa Clara, Calif. The processor 222 may also be implemented as a dedicated processor, such as a controller, microcontroller, embedded processor, a digital signal processor (DSP), a network processor, a media processor, an input/output (I/O) processor, and so forth. The processor 222 may have any number of processor cores, including one, two, four, eight or any other suitable number. The embodiments are not limited in this context.

The mobile computing device 204 may comprise a memory 224 in some embodiments. The memory 224 may comprise any machine-readable or computer-readable media capable of storing data, including both volatile and non-volatile memory. For example, the memory 224 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 224 may be included on the same integrated circuit as the processor 222, or alternatively some portion or all of the memory 224 may be disposed on an integrated circuit or other medium, for example a hard disk drive, that is external to the integrated circuit of the processor 222. The embodiments are not limited in this context.

As further shown in FIG. 2, mobile device 204 may comprise a display 226. Display 226 may comprise any suitable display unit for displaying information appropriate for a mobile computing device. In addition, display 226 may be implemented as an additional I/O device, such as a touch screen, touch panel, touch screen panel, and so forth. Touch screens may comprise display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. The effect of such overlays may allow a display to be used as an input device, to remove or enhance the keyboard and/or the mouse as the primary input device for interacting with content provided on display 226.

In one embodiment, for example, display 226 may be implemented by a liquid crystal display (LCD) or other type of suitable visual interface. Display 226 may comprise, for example, a touch-sensitive color display screen. In various implementations, the display 226 may comprise one or more thin-film transistors (TFT) LCD including embedded transistors. In such implementations, the display 226 may comprise a transistor for each pixel to implement an active matrix. While the embodiments are not limited in this context, an active matrix display may be desirable since it requires lower current to trigger pixel illumination and is more responsive to change than a passive matrix.

In various embodiments, mobile computing device 204 may communicate information (e.g. send and receive electromagnetic representations of the information) over a wireless shared media or network 202 via transceiver 228. The wireless shared media or network 202 may comprise one or more allocations of RF spectrum. The allocations of RF spectrum may be contiguous or non-contiguous. In some embodiments, the transceiver 228 may communicate information over the wireless shared media or network 202 using various multi-carrier techniques utilized by, for example, WiMAX or WiMAX II or LTE or LTE-Advanced systems. For example, the transceiver 228 may utilize various techniques to perform beamforming, spatial diversity or frequency diversity.

In general operation, base station 204 may be include a processor or processor circuit 222 configured or operative to receive information intended for a group of devices identified by a device group identifier (DGID), map the DGID to a common identifier known be each of the devices in the intended group of devices and multicast the information to the group of devices over one or more channels of wireless network 202 using the common identifier. For example, transceiver 228 may comprise a radio frequency (RF) transceiver operative to receive electromagnetic representations of the information from network 202 or from any of devices 206-$m$ or 208-$p$ over wireless network 202 for processing by processor 222 and sending or transmitting to a plurality of devices identified as a group by the DGID and the correspondingly assigned common identifier for the group to identify the MAC PDUs over the wireless channel, henceforth referred to as Device Group MAC layer ID (DGMACID) or, more generally, as a common identifier. In various embodiments, base station 204 may comprise at least a portion of a wireless local area network (WLAN) or wireless metropolitan area network (WirelessMAN) access point (AP) or base station and may also be operative to send and receive information from any number and type of devices. Other embodiments are described and claimed.

In various embodiments, while described herein as including a processor or processor circuit 222, it should be understood that in various embodiments processor or processor circuit 222 may be operative to execute group management module 230 configured to perform the steps described herein. For example, group management module 230 may comprise a software, firmware or other suitable module stored in memory 224 or any other suitable location to be executed by processor or processor circuit 222. The embodiments are not limited in this respect.

In some embodiments, group management module 230 may be operative on the processor circuit 222 to receive information intended for a group of devices identified by a device group identifier (DGID). For example, base station 204 may act as an intermediary responsible for delivering network traffic destined for one or more devices. In some embodiments, the traffic or information may comprise individual traffic intended for an individual device identified by an individual device ID (IID). In other embodiments, the information or network traffic may be intended for a group of devices. The information intended for the group of devices may be identified by a DGID which may comprise a common identifier shared by each device in the group of devices. In other embodiments, the group management module 230 may be operative to assign the DGID to the group of devices. Other embodiments are described and claimed.

The DGID may be mapped to a common identifier known by each device in the group of devices in various embodiments. For example, group management module 230 may be operative on the processor circuit 222 to select a common identifier for the group of devices and to correlate the DGID and the common identifier. In various embodiments, the common identifier corresponding to the DGID may be assigned to the group of devices and provided along with the DGID to each device in the group of devices. In some embodiments, the common identifier may comprise a group connection identifier (CID) or group flow identifier (FID) corresponding to the DGID and the group CID or group FID may be communicated in a generic MAC header (GMH) to the group of devices to identify information intended for the group of devices.

In various embodiments, the information intended for the group of devices may be multicast to the group of devices over one or more channels of the wireless network using the common identifier (e.g. group CID or group FID and/or the DGID). For example, base station 204 may receive information intended for devices 206-*m* of group 270 in some embodiments. In various embodiments, the group 270 may be assigned DGID 270 and the traffic received at base station 204 may be identified by DGID 270. Group management module 230 may be operative on processor circuit 222 to map DGID 270 to a group CID that has not otherwise been assigned to an individual device for individual traffic (e.g. an individual CID), such as group CID 270. Thereafter, base station 204 may be operative to multicast the received information via transceiver 228 over one or more channels of network 202 to each device 206-*m* of group 270 using group CID 270 that is known by each of the devices 206-*m*. Other embodiments are described and claimed.

For the above-described mapping and multicast to occur, groups must exist or must be created. For example, devices 206-*m* may be assigned to group 270 upon network creation or upon network entry by the 206-*m*. In some embodiments, the group management module 230 may be operative to receive a request from a device, including but not limited to any of devices 206-*m*, to enter the wireless network. After receiving the request, group management module 230 may be operative to assign the device(s) to a group of devices, such as group 270. In various embodiments, group management module 230 is shown as part of base station 204, however, one skilled in the art would readily understand that base station 204 may reside in any other suitable network entity such as a Gateway or Server that is part of the network and still fall within the described embodiments. For purposes of illustration and not limitation, group management module 230 is arranged to assigned devices to a group, such as group 270. It should be understood that any other suitable device or entity in the network may also perform the group assignment and still fall within the described embodiments. In other embodiments, one or more of devices 206-*m* may request to join a group of devices. In either event, group management module 230 may be operative to provide the device(s) 206-*m* with an individual common identifier (e.g. individual CID) for individual traffic and a group common identifier (e.g. group CID) for group traffic. In another embodiment, group management module 230 may be operative to provide the device(s) 206-*m* with an individual common identifier (e.g. individual FID) for individual traffic and a group common identifier (e.g. group FID) for group traffic. In some embodiments, group management module 230 may also be operative to provide the devices 206-*m* with the DGID corresponding to the group CID or group FID for the assigned or requested group of devices.

In some embodiments, the information received from the devices 206-*m* may used by base station 204 to identify similar, related or otherwise associated devices 206-*m*. For example, the information may comprise traffic characteristics including but not limited to a traffic interval or traffic packet size. In other embodiments, the information may comprise location information regarding the placement or physical location of the devices 206-*m*, the proximity of devices 206-*m* to other devices 206-*m* or any other location information. In some embodiments, the information may comprise network entry or network registration information that is received from one or more of the plurality of devices 206-*m* when the devices 206-*m* enter the network 202. The embodiments are not limited in this respect.

In various embodiments, group management module 230 may be operative to process the received information to aggregate two or more of the devices 206-*m* as a group. For example, the base station 204 may be operative to use the information received from the devices 206-*m* as a grouping criteria to identify devices 206-*m* that may be grouped together as a group 270. In some embodiments, group management module 230 may be operative to aggregate or group two or more devices 206-*m* as an group based on location information received from the devices 206-*m*. For example, the location information may comprise proximity information for devices 206-*m* to other devices 206-*m*, proximity to the base station 204, location within a building or a floor of a building, or any other suitable, identifiable location.

In other embodiments, group management module 230 may be operative to aggregate or group the two or more devices 206-*m* as group 270 based on traffic characteristics received from the devices 206-*m*. For example, the traffic characteristics may comprise one or more of a traffic interval or traffic packet size and group management module 230 may be operative to group two or more devices 206-*m* together that have similar traffic characteristics. Other embodiments are described and claimed.

Group management module 230 may be operative to assign a group common identifier (e.g. group CID or group FID) to the group 270 in some embodiments. For example, a group common identifier may be assigned to each of the devices 206-*m* selected or arranged to be part of the group 270. In various embodiments, the group common identifier may comprise a known multicast ID such as an available CID or FID to avoid impacting current wireless standards.

In various embodiments, group management module 230 may be operative to provide the group common identifier to the devices 206-*m* in the group 270 and to receive an acceptance acknowledgement of the group identifier from the devices 206-*m*. For example, group management module 230 may send, using transceiver 228, the group common identifier to the devices 206-*m* in the group 270, and may receive, via transceiver 228, a response from the devices 206-*m* acknowledging receipt and acceptance of the group common identifier and, in turn, participation in the group 270.

In some embodiments, group management module 230 may be operative to multicast data to the devices 206-*m* in the group 270 over the one or more wireless channels of wireless network 202. For example, group management module 230 may be operative to multicast one or more of group based traffic and/or control signaling information such as group based paging information, to the devices 206-*m* in the group 270 using network 202. In various embodiments, multiple individual messages that would otherwise be required to be sent to each of the devices 206-*m* individually may be replaced by a group based message or messaging scheme that may reduce service overhead significantly.

In various embodiments, group management module 230 may be operative to utilize the group 270 to efficiently provide or multicast any number, type or size of information to the devices 206-*m* of the group 270. For example, downlink multicast data for the group 270 may be sent from the base station 204 to the devices 206-*m* in group M2M 270. In other embodiments, group based control signaling for the group 270 may be transmitted, such as group-oriented modulation and coding schemes, power control and resource allocation mechanisms. In other embodiments, group paging may be employed for the devices 206-*m* of the group 270.

Following acknowledgement of the group common identifier by the devices 206-*m*, base station 204 may be operative to provide group-specific information to the devices 206-*m* of group 270, such as group based control signaling, polling paging messages, or broadcast traffic using the multicast channels. The embodiments are not limited in this respect. The foregoing will be better understood with reference to the following examples, transmission diagrams and logic diagrams.

In various embodiments, as described above and as described in more detail hereinafter, a BS such as base station 204 may provide a multicast service for group of devices, such as a group of M2M devices, that share a downlink multicast service flow. The BS may be operative to initiate the establishment of a service flow using the DSA procedures. During the establishment of the service flow, the service flow is assigned an M2MCID, which uniquely identifies the service flow. In some embodiments, an M2MCID may comprise one embodiment of a group CID, group FID or DGMACID. The M2M device shall retain these identifiers in Idle Mode. The BS shall provide the mapping between the service flow and the M2MCID during the DSA signaling and may modify this mapping using the DSC procedures or by using M2MCID Update TLV during network re-entry. Other embodiments are described and claimed.

FIGS. 3A and 3B illustrates example transmission diagrams for wireless networks, such as wireless networks 102 and 202, in some embodiments. Wireless networks 102 and 202 may represent, in some embodiments, wireless networks implementing a WiMAX wireless network which may include, in some embodiments, a combination of a plurality of protocols and standards, as described above. For example, the transmission diagram of FIGS. 3A, 3B and 3C may illustrate, in some embodiments, an 802.16p or 802.16.1b base station 302, a first device (e.g. Device 1) 304 that is part of a first group (e.g. Group 1), a second device (e.g. Device 2) 305 that is also part of the first group and a third device (e.g. Device 3) 306 that is similarly part of the first group. FIG. 3A may also show, in some embodiments a network 310 which may comprise any suitable network arranged to provide, generate or relay information to one or more of base station 302 or devices 304, 305 or 306. While a limited number and type of mobile stations, devices and base stations are shown for purposes of illustrations, the embodiments are not limited in this context.

As shown in the transmission diagram 300 of FIG. 3A, base station 302 may be operative to receive information from network 310 over one or more wired or wireless channels 320. For example, information 320 may be received from network 310 that is intended for two or more of devices 304, 305 and 306 assigned to Group 1. In various embodiments, as shown at 322, base station 302 may be operative to map or otherwise correlate a DGID in the received information 320 to a group CID or group FID that is known to each of the devices 304, 305 and 306 of Group 1. As shown at 324, base station 302 may be operative to multicast the information to each of the devices 304, 305 and 306 of Group 1 and this information may include the group CID or group FID to ensure that each of the intended recipient devices is capable of identifying the information as intended for their receipt.

FIG. 3B illustrates an example transmission diagram 350 in which one or more devices request access to a network and are assigned to a device group for group communications. As shown in FIG. 3B, base station 302 may be operative to receive a request 352, 354, 365 from devices 304, 305 and 306 respectively to access to a wireless network. As shown at 358, base station 302 may be operative to assign the devices 304, 305 and 306 to Group 1 based on information received in the requests 352, 354, 365. For example, the requests 352, 354, 356 may comprise dynamic service add requests (DSA_REQ) in some embodiments. In various embodiments, location information or other suitable grouping criteria may be extracted or identified from the DSA_REQ and may be used as the criteria to group the devices 304, 305 and 306 at 358.

As shown at 360, 362 and 364, base station 302 may be operative to send and devices 304, 305 and 306 may be operative to receive an individual connection identifier (CID) or individual flow identifier (FID) assigned for individual traffic and a group CID assigned or a group FID for group traffic. For example, base station 302 may provide a dynamic service add response (DSA_RSP) to the devices 304, 305, 306. In the DSA_RSP, the base station 302 may include a group CID or group FID that may or may not be acknowledged (ACK) by the devices 304, 305 and 306. In some embodiments, based on the grouping, the base station 302 may be operative to send and the devices 304, 305 and 306 may be operative to receive, group information 366 intended for the wireless devices 304, 305 and 306 assigned to the common group (e.g. Group 1) and this information may be identified by the group CID or group FID. For example, based on the grouping, base station 302 may be operative to provide control signaling to Group 1, provide multicast data to the group, page one or more devices in the group or perform other suitable group-based activities until one or more of the devices deregisters from the network or the group is otherwise altered or dissolved.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

FIGS. 4A, 4B, 4C and 4D illustrate embodiments of logic flows 400, 440, 460 and 480 respectively for enabling group traffic management in a wireless network. In various embodiments, the logic flows 400, 440, 460 and 480 may be performed by various systems, nodes, and/or modules and may be implemented as hardware, software, and/or any combination thereof, as desired for a given set of design parameters or performance constraints. For example, the logic flows 400, 440, 460 and 480 may be implemented by a logic device (e.g., node, STA, wireless device, base station, M2M device, etc.) and/or logic comprising instructions, data, and/or code to be executed by a logic device. For purposes of illustration, and not limitation, the logic flows 400, 440, 460 and 480 are described with reference to FIGS. 1, 2, 3A and 3B. The embodiments are not limited in this context.

Figure 4A:
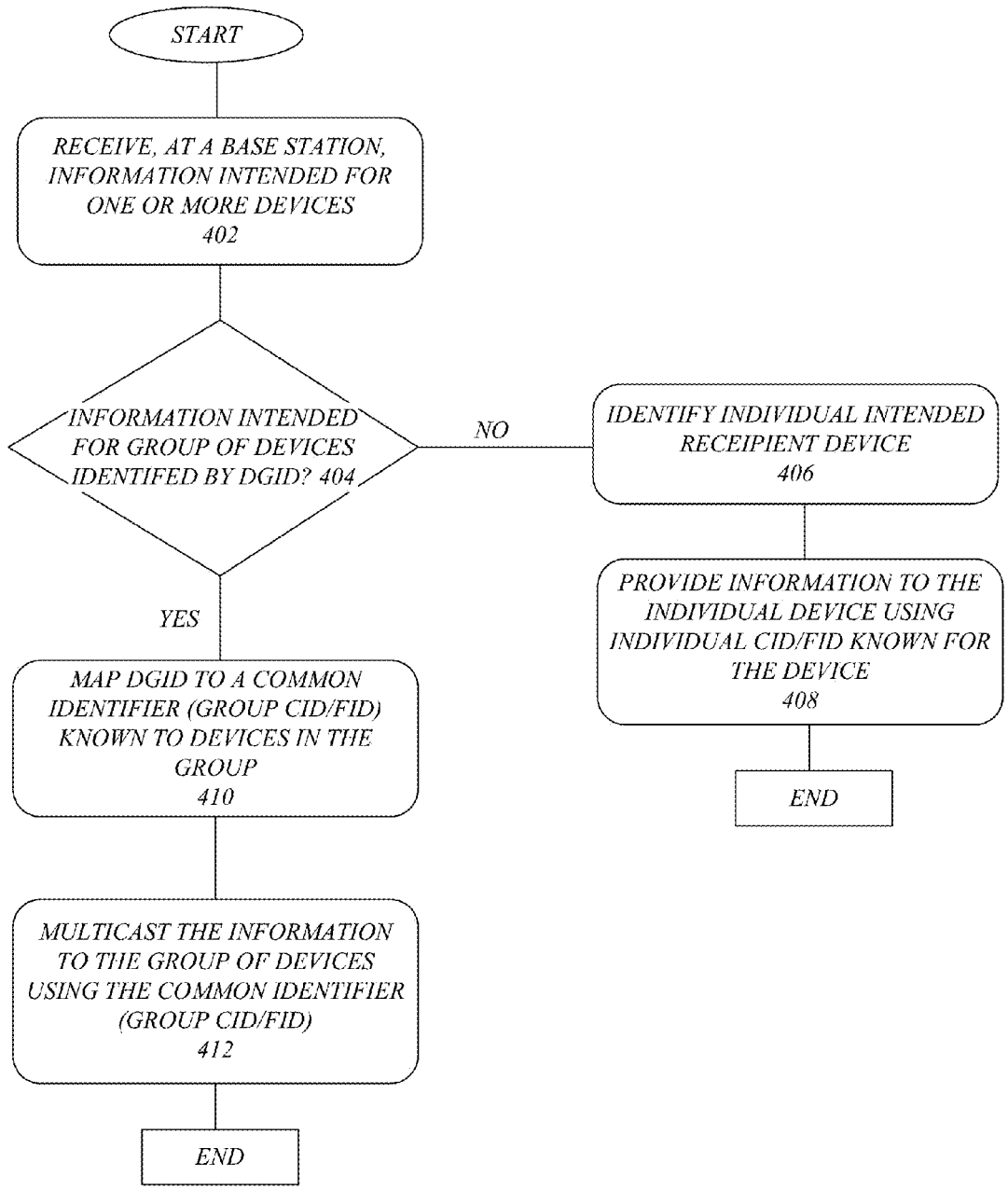
FIG. 4A illustrates one embodiment of a first logic flow.

In various embodiments, as shown in FIG. 4A, information intended for a one or more devices may be received at a base station at 402. For example, base station 204 may receive information intended for one or more of devices 208-1-$p$ or 206-$m$. In some embodiments, at 404 the base station may be operative to determine if the information is intended for a group of devices identified by a DGID. For example, in some embodiments, the information received at the base station 204 may comprise group traffic identified by a DGID that is used to identify devices 206-$m$ of group 270. In other embodiments, the received information may comprise individual traffic intended for one of devices 208-$p$ or 206-$m$. If the information is not intended for a group of devices, the individual intended recipient device may be identified at 406 and the information may be provided to the individual device using an individual CID or FID known by the device at 408.

If the received information is intended for a group of devices, the base station may be operative to map the DGID to a common identifier known to by each device in the group of devices at 410. For example, base station 410 may be operative to map the received DGID to a group CID or group FID selected from an available list of CIDs or FIDs that are not assigned to individual devices for individual traffic. In various embodiments, the assignment of group CID or group FID may additionally or alternatively be performed as discussed elsewhere herein and the base station 410 may be operative to map the DGID to the assigned group CID or group FID and send the traffic over an airlink in MAC PDU(s).

While not shown in FIG. 4A, in some embodiments the information intended for the group may not contain identification such as a DGID to identify the group. In these embodiments, the base station may be operative to assign a DGID to the group of devices, assign the common identifier (e.g. group CID or group FID) corresponding to the DGID to the group of devices and provide the common group identifier and the DGID to each device in the group of devices. Other embodiments are described and claimed.

In various embodiments, at 412 the information may be multicast from the base station to the group of devices over one or more channels of the wireless network using the common identifier. For example, base station 204 may be operative to multicast the group information to the group 270 using one or more channel of wireless network 202. The embodiments are not limited in this respect.

In some embodiments, while not shown in FIG. 4A, two or more DGIDs may be assigned to one common identifier. In these embodiments, where multiple DGIDs are shared be the same CID or FID, the DGID may be used in the DL-MAP whereas the group CID or group FID may be used in the Generic MAC Header (GMH) for traffic delivery to ensure that the devices are able to identify the traffic associate with the appropriate CID or FID. In these embodiments, the DGID may be included in the DL-MAP to assist users in determining the device group for which the common identifier is carrying the traffic or information at any given time. Other embodiments are described and claimed.

Figure 4B:
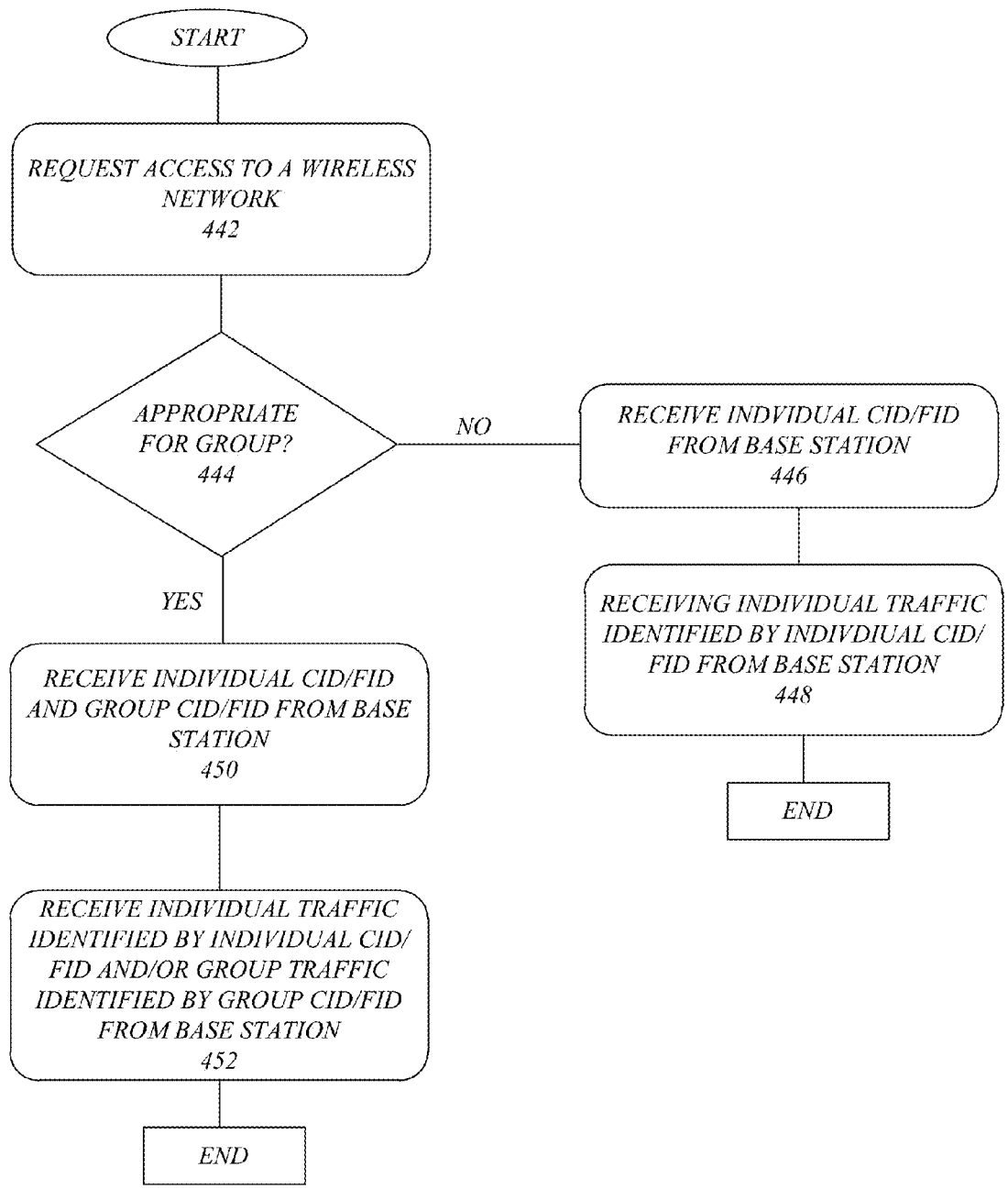
FIG. 4B illustrates one embodiment of a second logic flow.

As shown in FIG. 4B, a device, such as a wireless device or an M2M device, may be operative to request access to a wireless network at 442. For example, device 206-1 may be operative to request, from base station 402, access to a wireless network such as network 202. In some embodiments, a determination as to whether or not the requesting device is appropriate for a group may be made at 444. For example, device 206-1 may share common characteristics with one or more other devices 206-2-m and therefore, it may be appropriate or advantageous to group these devices. In other embodiments, while now shown in FIG. 4B, the requesting device may request permission to join an existing group.

If the requesting device is not appropriate for a group or for group communications, the requesting device may receive an individual CID or FID from the base station at 446. For example, as part of the DSA_REQ messaging between the device 206-1 and base station 204, base station 204 may provide device 206-1 with a CID or FID for use by the device 206-1 in identifying individual traffic intended for the device 206-1. At 448, in various embodiments, individual traffic identified by the individual CID or FID may be received from the base station. Other embodiments are described and claimed.

In various embodiments, if the requesting device has requested to be added to a group or is suitable to be added to a group, the requesting device may receive an individual connection identifier (CID) or Flow ID (FID) assigned for individual traffic and a group CID or a group FID assigned for group traffic from the base station at 450. For example, device 206-1 may receive an individual CID or FID to identify traffic intended only for device 206-1 and may also receive a group CID or group FID to identify traffic intended for all of the devices of group 270. In some embodiments, multicast information intended for the wireless device and one or more other wireless devices assigned to a group that is identified by DGID and the group CID or group FID may be received at 452. Also or alternatively at 452, individual traffic identified by the individual CID or FID may be received from the base station. For example, base station 204 may be operative to send group traffic identified be the group CID or group FID to the group of devices 270 and may also be operative to send individual traffic intended for device 206-1 identified by an individual CID or FID over one or more channels of network 202. The embodiments are not limited in this respect.

While not shown in FIG. 4B, in some embodiments a device group identifier (DGID) corresponding to the group CID or group FID may be received from the base station in some embodiments. For example, the DGID may comprise an identifier for identifying network layer traffic intended for a wireless device and the group CID or FID may comprise an identifier for identifying link layer traffic intended for the wireless device.

In some embodiments, the group CID or group FID may be arranged in the Generic MAC Header (GMH) of MAC PDU(s) from the base station to the mobile station. As such, the mobile station may be operative to identify the group CID or group FID in the GMH of the received information, determine if the group CID or group FID corresponds to an assigned device group identifier (DGID) for a group of devices including the wireless device and accepting the information if the wireless device belongs to the group identified by the group CID or group FID and the DGID. While not limited in this respect, in some embodiments the wireless device may comprise a machine-to-machine (M2M) device comprising a sensor, meter, or mobile computing device and the wireless network may be operative to use protocols compatible with an Institute of Electrical and Electronics Engineers (IEEE) 802.16p or 802.16.1b or 3GPP 3G, LTE, LTE-Advanced standard. Other embodiments are described and claimed.

In some embodiments, as shown in FIG. 4C, information intended for a group of devices identified by a device group identifier (DGID) may be received by a base station at 462. For example, base station 204 may receive information intended for devices 206-m of group 207. In various embodiments, the DGID may be mapped to a common identifier known by each device in the group of devices at 464. For example, the base station 204 may be operative to map the received DGID to one or more group CIDs or group FIDs that are known to the devices 206-m of group 270. At 466, in some embodiments, the information may be multicast from the base station to the group of devices over one or more channels of the wireless network using the common identifier. For example, base station 204 may multicast, using the group CID or group FID, the information to the group 270. Other embodiments are described and claimed.

As shown in FIG. 4D, access to a wireless network may be requested at 482. For example, wireless device 206-1 may request access to network 202 from base station 204. In various embodiments, an individual connection identifier (CID) or individual flow identifier (FID) assigned for individual traffic and a group CID or a group FID assigned for group traffic may be received from the base station at 484. For example, the base station 204 may assign an individual CID or individual FID to device 206-1 for traffic intended just for device 206-1 and may also assign a group CID or a group FID to device 206-1 for traffic intended for each device 206-m in group 270. In some embodiments, multicast information intended for the wireless device and one or more other wireless devices assigned to a common group may be received at 486. For example, information identified by the DGID and corresponding group CID or group FID may be multicast to and received by device 206-1 and the other devices of group 270. Other embodiments are described and claimed.

Figure 5:
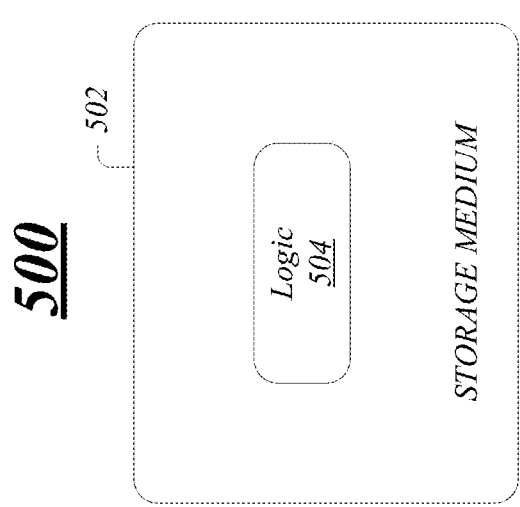
FIG. 5 illustrates one embodiment of an article of manufacture.

FIG. 5 illustrates one embodiment of an article of manufacture 500. As shown, the article 500 may comprise a storage medium 502 to store logic 504 for managing group traffic in a wireless network in some embodiments. For example, logic 504 may be used to implement a processor circuit or group management module for a mobile computing device, node or other system, as well as other aspects of nodes 104-n, for example. In various embodiments, the article 500 may be implemented by various systems, nodes, and/or modules.

The article 500 and/or machine-readable or computer-readable storage medium 502 may include one or more types of computer-readable storage media capable of storing data, including volatile memory or, non-volatile memory, removable or non-removable memory, erasable or non-erasable memory, writeable or re-writeable memory, and so forth. In some embodiments, the store medium 502 may comprise a non-transitory storage medium. Examples of a machine-readable storage medium may include, without limitation, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information. Moreover, any media involved with downloading or transferring a computer program from a remote computer to a requesting computer carried by data signals embodied in a carrier wave or other propagation medium through a communication link (e.g., a modem, radio or network connection) is considered computer-readable storage media.

The article 500 and/or machine-readable medium 502 may store logic 504 comprising instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The logic 504 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context. When the logic 504 is implemented as software, any suitable processor and memory unit may execute the software.

Figure 6:
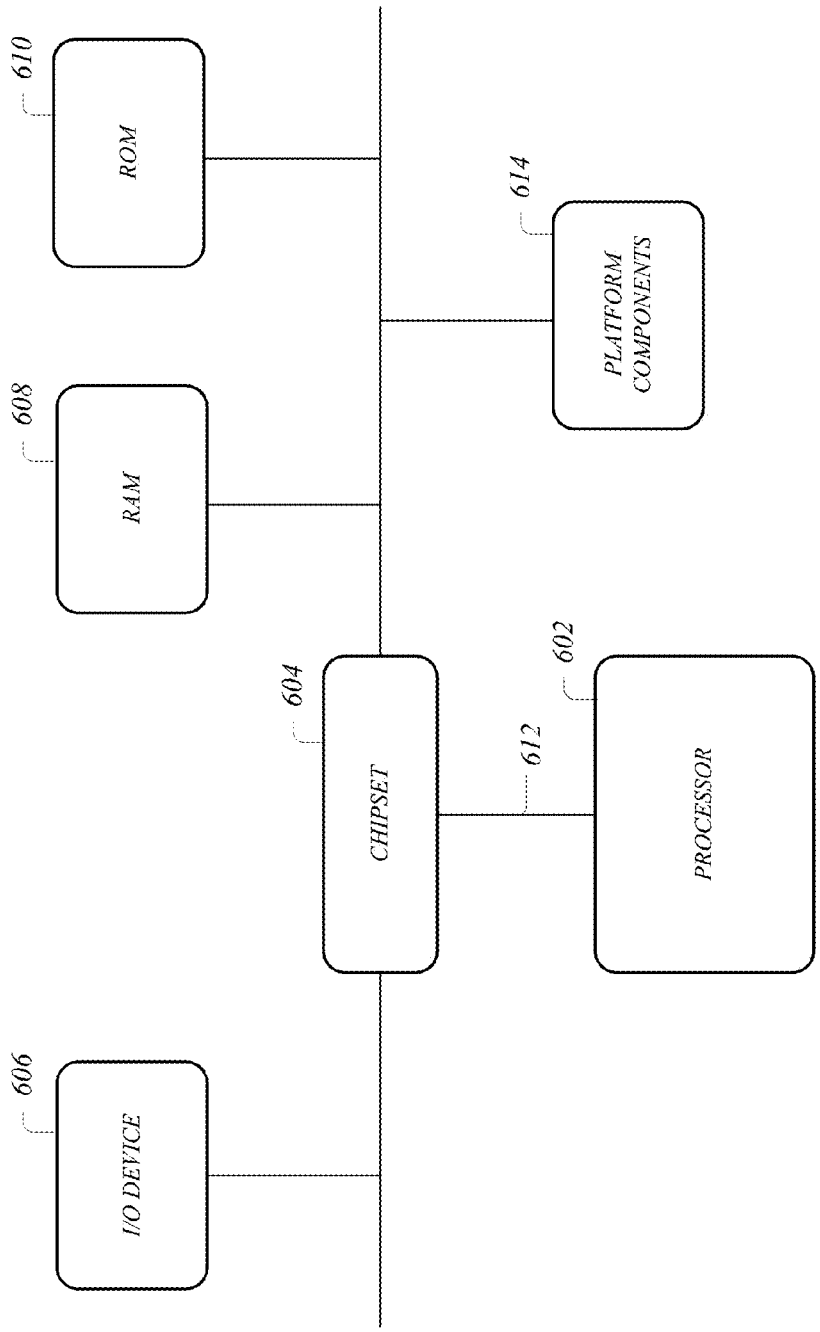
FIG. 6 illustrates one embodiment of a second apparatus.

FIG. 6 is a diagram of an exemplary system embodiment. In particular, FIG. 6 is a diagram showing a system 600, which may include various elements. For instance, FIG. 6 shows that system 600 may include a processor 602, a chipset 604, an input/output (I/O) device 606, a random access memory (RAM) (such as dynamic RAM (DRAM)) 608, and a read only memory (ROM) 610, and various platform components 614 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 600 may include various interface circuits, such as an Ethernet interface and/or a Universal Serial Bus (USB) interface, and/or the like. In some exemplary embodiments, the I/O device 606 may comprise one or more input devices connected to interface circuits for entering data and commands into the system 600. For example, the input devices may include a keyboard, mouse, touch screen, track pad, track ball, isopoint, a voice recognition system, and/or the like. Similarly, the I/O device 606 may comprise one or more output devices connected to the interface circuits for outputting information to an operator. For example, the output devices may include one or more digital displays, printers, speakers, and/or other output devices, if desired. For example, one of the output devices may be a digital display. The display may be a cathode ray tube (CRTs), liquid crystal displays (LCDs), light emitting diode (LED) display or any other type of display.

The system 600 may also have a wired or wireless network interface to exchange data with other devices via a connection to a network. The network connection may be any type of network connection, such as a wireless connection or a wired connection, including but not limited to a cellular connection, radio frequency connection, an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

The following examples pertain to further embodiments:

A method for communicating in a wireless network may comprise receiving, at a base station, information intended for a group of devices identified by a device group identifier (DGID), mapping, at the base station, the DGID to a common identifier known by each device in the group of devices, and multicasting the information from the base station to the group of devices over one or more channels of the wireless network using the common identifier.

Such a method may comprise assigning the DGID to the group of devices, assigning the common identifier corresponding to the DGID to the group of devices, and providing the common identifier and the DGID to each device in the group of devices Such a method may comprise receiving a request from a device to enter the wireless network, assigning the device to a group of devices or receiving a request from the device to join a group of devices, providing the device with an individual identifier for individual traffic, and providing the device with a group common identifier for group traffic and a DGID corresponding to the group common identifier for the assigned or requested group of devices.

According to such a method, the common identifier may comprise a group connection identifier (CID) corresponding to the DGID, the group CID communicated in a Generic MAC Header (GMH) to the group of devices to identify information intended for the group of devices.

According to such a method, the group CID may be selected from an available list of CIDs that are not assigned to individual devices for individual traffic.

According to such a method, the common identifier may comprise a flow identifier (FID) corresponding to the DGID, the FID communicated in a Generic MAC Header (GMH) to the group of devices to identify information intended for the group of devices.

Such a method may comprise assigning two or more DGIDs to one common identifier and sending the DGID in a DL-MAP of the multicast information.

Such a method may comprise assigning two or more devices to a group based on one or more common characteristics of the two or more devices, the one or more common characteristics comprising one or more of geography, subscriber profile, service type or device capabilities for the two or more devices.

According to such a method, the group of devices may comprise a plurality of machine-to-machine (M2M) devices, the plurality of M2M devices comprising one or more sensors, meters, or mobile computing devices.

According to such a method, the wireless network may be operative to use protocols compatible with an Institute of Electrical and Electronics Engineers (IEEE) 802.16p or 802.16.1b standard.

At least one machine readable medium comprising a plurality of instructions that in response to being executed on a computing device cause the computing device to carry out such a method.

A communications device may be arranged to perform such a method.

An apparatus may comprise means for performing such a method.

A system may comprise an apparatus arranged to perform such a method and a radio frequency (RF) transceiver operative to send and receive electromagnetic representations of the information.

An apparatus for communicating in a wireless network may comprise a processor circuit and a group management module operative on the processor circuit to receive information intended for a group of devices identified by a device group identifier (DGID), map the DGID to a common identifier known by each device in the group of devices, and multicast the information to the group of devices over one or more channels of the wireless network using the common identifier.

With respect to such an apparatus, the group management module may be operative to assign the DGID to the group of devices, assign the common identifier corresponding to the DGID to the group of devices, and provide the common identifier and the DGID to each device in the group of devices.

With respect to such an apparatus, the group management module may be operative to receive a request from a device to enter the wireless network, assign the device to a group of devices or receive a request from the device to join a group of devices, provide the device with an individual identifier for individual traffic, and provide the device with a group common identifier for group traffic and a DGID corresponding to the group common identifier for the assigned or requested group of devices.

With respect to such an apparatus, the common identifier may comprise a group connection identifier (CID) or group flow identifier (FID) corresponding to the DGID, the group CID or group FID communicated in a generic MAC header (GMH) to the group of devices to identify information intended for the group of devices.

A system for communicating in a wireless network may comprise an antenna array, a transceiver coupled to the antenna array such an apparatus.

A method for communicating in a wireless network may comprise requesting, by a wireless device, access to the wireless network, receiving, from a base station, an individual connection identifier (CID) assigned for individual traffic and a group CID assigned for group traffic, and receiving, from the base station, information intended for the wireless device and one or more other wireless devices assigned to a common group, the information identified by the group CID.

Such a method may comprise receiving, at the wireless device, a device group identifier (DGID) corresponding to the group CID, the DGID identifying network layer traffic intended for the wireless device and the group CID identifying link layer traffic intended for the wireless device.

Such a method may comprise identifying the group CID in a Generic MAC Header (GMH) of the received information, determining if the group CID corresponds to an assigned device group identifier (DGID) for a group of devices including the wireless device, and accepting the information if the wireless device belongs to the group identified by the group CID and the DGID.

According to such a method, the wireless device may comprise a machine-to-machine (M2M) device comprising a sensor, meters, or mobile computing device.

According to such a method, the wireless network may be operative to use protocols compatible with an Institute of Electrical and Electronics Engineers (IEEE) 802.16p or 802.16.1b standard.

At least one machine readable medium comprising a plurality of instructions that in response to being executed on a computing device cause the computing device to carry out such a method.

A communications device may be arranged to perform such a method

An apparatus may comprise means for performing such a method.

A system may comprise an apparatus arranged to perform such a method and a radio frequency (RF) transceiver operative to send and receive electromagnetic representations of the information.

The foregoing represent are only a few examples of the problems that may be overcome by implementing a method, system and apparatus to manage or group M2M devices in a wireless communications system, and it may be appreciated that other problems may be overcome and other advantages may exist as well.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

What is claimed is:

1. A method for communicating in a wireless network, the method comprising:
   receiving, at a base station, information intended for a group of devices identified by a device group identifier (DGID);
   mapping, at the base station, the DGID to a common identifier known by each device in the group of devices, the common identifier communicated in a Generic MAC Header (GMH) to the group of devices to identify information intended for the group of the devices; and
   multicasting the information from the base station to the group of devices over one or more channels of the wireless network using the common identifier.

2. The method of claim 1, comprising:
   assigning the DGID to the group of devices;
   assigning the common identifier corresponding to the DGID to the group of devices; and
   providing the common identifier and the DGID to each device in the group of devices.

3. The method of claim 1, comprising:
   receiving a request from a device to enter the wireless network;
   assigning the device to a group of devices or receiving a request from the device to join a group of devices;
   providing the device with an individual identifier for individual traffic; and
   providing the device with a group identifier for group traffic and a DGID corresponding to the group identifier for the assigned or requested group of devices.

4. The method of claim 1, the common identifier comprising a group connection identifier (CID) corresponding to the DGID.

5. The method of claim 4, the group CID selected from an available list of CIDs that are not assigned to individual devices for individual traffic.

6. The method of claim 1, the common identifier comprising a flow identifier (FID) corresponding to the DGID.

7. The method of claim 1, comprising:
   assigning two or more DGIDs to one common identifier; and
   sending the DGID in a DL-MAP of the multicast information.

8. The method of claim 1, comprising:
   assigning two or more devices to a group based on one or more common characteristics of the two or more devices, the one or more common characteristics comprising one or more of geography, subscriber profile, service type or device capabilities for the two or more devices.

9. The method of claim 1, the group of devices comprising a plurality of machine-to-machine (M2M) devices, the plurality of M2M devices comprising one or more sensors, meters, or mobile computing devices.

10. The method of claim 1, the wireless network operative to use protocols compatible with an Institute of Electrical and Electronics Engineers (IEEE) 802.16p or 802.16.1b standard.

11. At least one non-transitory machine readable medium comprising a plurality of instructions that in response to being executed on a computing device cause the computing device to carry out a method according to claim 1.

12. An apparatus for communicating in a wireless network, the apparatus comprising:
    a processor circuit; and
    a group management module operative on the processor circuit to receive information intended for a group of devices identified by a device group identifier (DGID) and map the DGID to a common identifier known by each device in the group of devices, the common identifier communicated in a Generic MAC Header (GMH) to the group of devices to identify information intended for the group of the devices, the group management module operative on the processor circuit to multicast the information to the group of devices over one or more channels of the wireless network using the common identifier.

13. The apparatus of claim 12, the group management module operative to assign the DGID to the group of devices, assign the common identifier corresponding to the DGID to the group of devices, and provide the common identifier and the DGID to each device in the group of devices.

14. The apparatus of claim 12, the group management module operative to receive a request from a device to enter the wireless network, assign the device to a group of devices or receive a request from the device to join a group of devices, provide the device with an individual identifier for individual traffic, and provide the device with a group common identifier for group traffic and a DGID corresponding to the group common identifier for the assigned or requested group of devices.

15. The apparatus of claim 12, the common identifier comprising a group connection identifier (CID) or group flow identifier (FID) corresponding to the DGID.

16. A system for communicating in a wireless network, the system comprising:
    an antenna array;
    a transceiver coupled to the antenna array; and
    an apparatus according to claim 12.

17. A method for communicating in a wireless network, the method comprising:
    requesting, by a wireless device, access to the wireless network;
    receiving, from a base station, an individual connection identifier (CID) assigned for individual traffic and a group CID assigned for group or multicast traffic; and
    receiving, from the base station, multicast information intended for the wireless device and one or more other wireless devices assigned to a common group, the information identified by the group CID, the group CID comprised in a Generic MAC Header (GMH) of the received multicast information.

18. The method of claim 17, comprising
    receiving, at the wireless device, a device group identifier (DGID) corresponding to the group CID, the DGID identifying network layer traffic intended for the wireless device and the group CID identifying link layer traffic intended for the wireless device.

19. The method of claim 17, comprising:

identifying the group CID in the GMH;

determining if the group CID corresponds to an assigned device group identifier (DGID) for a group of devices including the wireless device; and accepting the information if the wireless device belongs to the group identified by the group CID and the DGID.

20. The method of claim 17, the wireless device comprising a machine-to-machine (M2M) device comprising a sensor, meters, or mobile computing device.

21. The method of claim 17, the wireless network operative to use protocols compatible with an Institute of Electrical and Electronics Engineers (IEEE) 802.16p or 802.16.1b standard.

22. At least one non-transitory machine readable medium comprising a plurality of instructions that in response to being executed on a computing device cause the computing device to carry out a method according to claim 17.

* * * * *